US006811266B2

(12) United States Patent
Lung et al.

(10) Patent No.: US 6,811,266 B2

(45) Date of Patent: Nov. 2, 2004

(54) SUPPORT STRUCTURE FOR PROJECTOR

(75) Inventors: Hsu Shih Lung, Taoyuan (TW); Wen-Chung Ho, Taoyuan (TW); Chih-Ping Wu, Taipei (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 10/226,063

(22) Filed: Aug. 21, 2002

(65) Prior Publication Data

US 2003/0071978 A1 Apr. 17, 2003

(30) Foreign Application Priority Data

Oct. 12, 2001 (TW) ...................................... 90217448 U

(51) Int. Cl.[7] .......................... G03B 3/00; G03B 21/14; G03B 21/22

(52) U.S. Cl. ........................ 353/101; 353/100; 353/119

(58) Field of Search ................................ 353/100, 101, 353/119, 122, 821, 822, 823, 824, 825, 826, 827, 828, 829, 830

(56) References Cited

U.S. PATENT DOCUMENTS 5,842,761 A * 12/1998 Futakami et al. ........... 353/119
6,469,839 B2 * 10/2002 Agata ......................... 359/694
6,547,402 B2 * 4/2003 Masuda ...................... 353/101
6,565,213 B1 * 5/2003 Yamaguchi et al. .......... 353/33
6,626,376 B1 * 9/2003 Rose .......................... 239/264
6,626,658 B2 * 9/2003 Ito et al. ..................... 425/170

* cited by examiner

*Primary Examiner*—Rodney Fuller
*Assistant Examiner*—Andrew Sever
(74) *Attorney, Agent, or Firm*—Ladas & Parry LLP

(57) ABSTRACT

Support structure for a projector. The projector includes an optical engine, a lens sleeve and a support structure. The lens sleeve has an end connected to the optical engine, like a cantilever beam. The support structure supports the lens sleeve in such a manner that the lens sleeve can be rotated.

13 Claims, 4 Drawing Sheets

6311
6312
6312
631
632
6321
6322
6322

SUPPORT STRUCTURE FOR PROJECTOR

BACKGROUND OF THE INVENTION

1. Field of the Invention

The present invention relates in general to a support structure for a projector.

2. Description of the Related Art

Referring to FIG. 1, a conventional lens sleeve 12 has an end fixed to an optical engine 10 via screws 11, and other portions extending out from the optical engine 10 like a cantilever beam. In operation, the lens sleeve 12 is rotated to adjust the focus or zoom.

The lens sleeve 12 bends due to its own weight. The above support structure supports the lens sleeve 12 well when the lens sleeve 12 is small, however, a large lens sleeve bends significantly, so that the lenses therein tend to deviate from predetermined positions. Thus, adjusting the focus is difficult. More seriously, the lens sleeve 12 cannot be rotated to adjust the focus and zoom.

SUMMARY OF THE INVENTION

An object of the present invention is to improve the support structure for a projector. The improved support structure prevents the lens sleeve from bending, allowing the lens sleeve to be freely rotated.

The projector of the present invention includes an optical engine, a lens sleeve and a support structure. The lens sleeve has an end connected to the optical engine, like a cantilever beam. The support structure supports the lens sleeve via rollers or pads so that the lens sleeve can be rotated.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
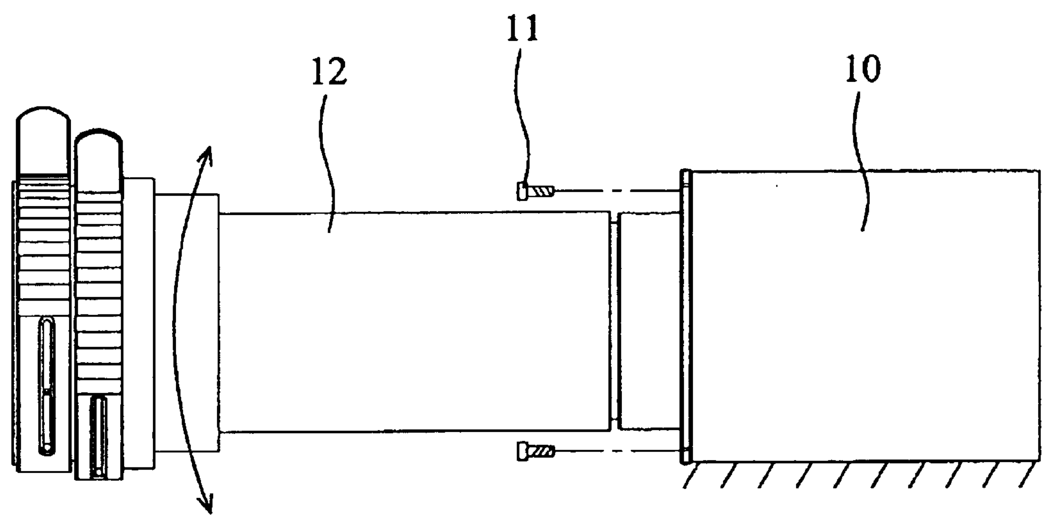
FIG. 1 is a schematic diagram of a conventional support structure for a projector.
Figure 2:
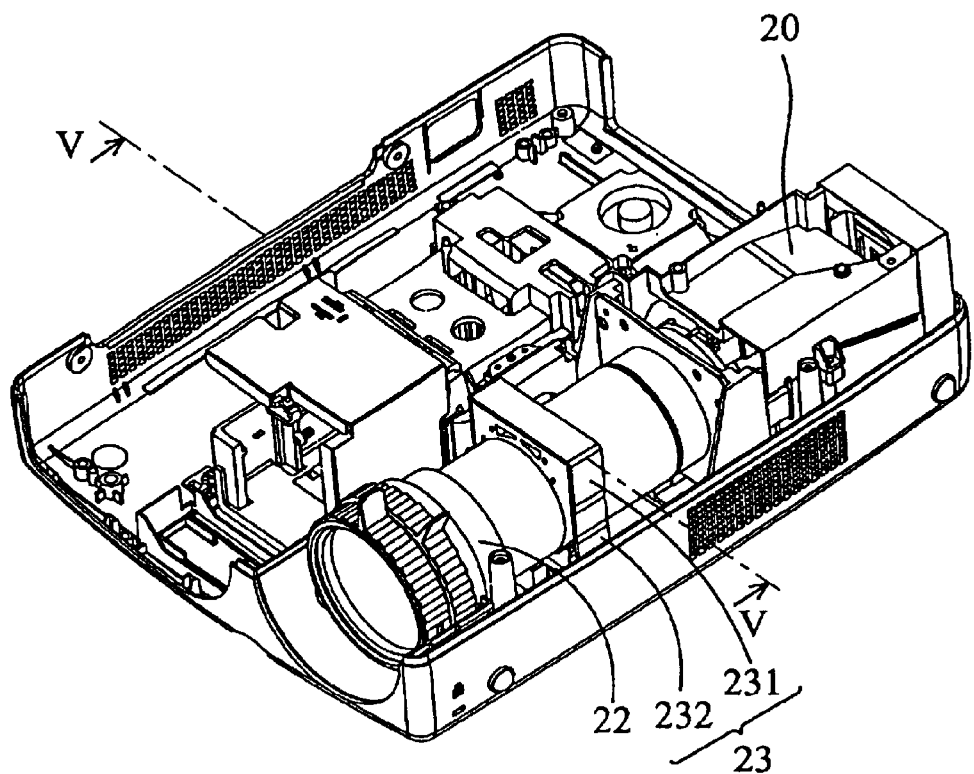
FIG. 2 depicts a support structure of a projector in accordance with a first embodiment of the present invention.

FIG. 2 depicts a support structure of a projector in accordance with a first embodiment of the present invention, wherein a lens sleeve 22 is screwed to an optical engine 20. To prevent the lens sleeve 22 from bending due to its own weight, the lens sleeve 22 is supported by a support structure 23.

Figure 3:
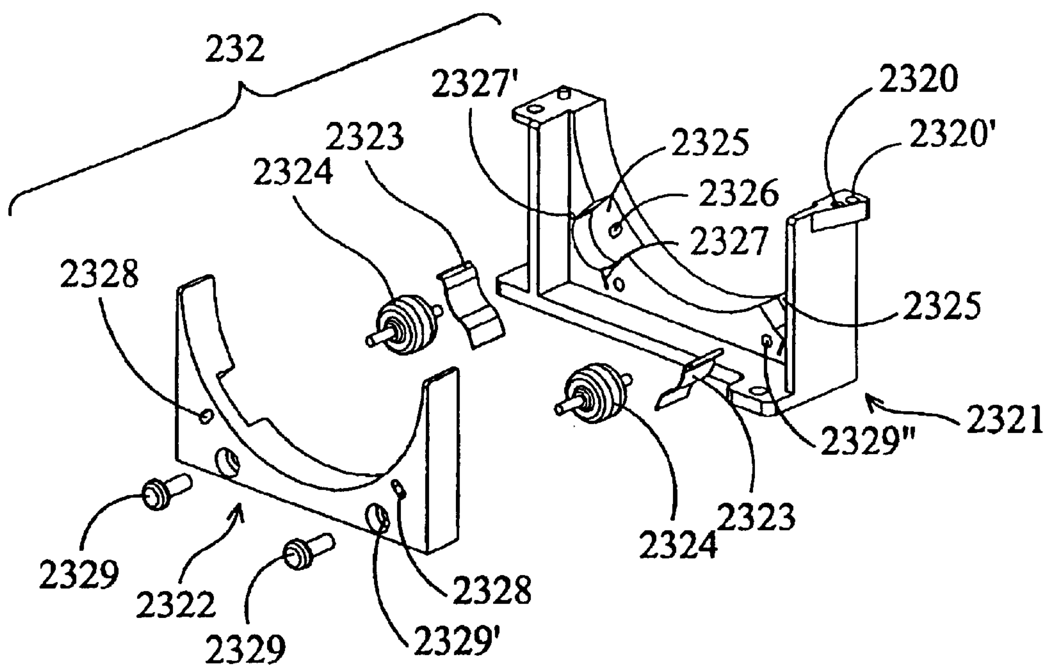
FIG. 3 is an exploded diagram of a lower support frame of the support structure of FIG. 2.

The support structure 23 of the present invention includes an upper lens support frame 231 and a lower lens support frame 232, both of which have semicircular configurations so that the lens sleeve 22 can be held by the upper lens support frame 231 and the lower lens support frame 232. Referring to FIG. 3, the lower lens support frame 232 has a body 2321 and a cover 2322. Two recesses 2325 are provided on the body 2321. The body 2321 and the cover 2322 are fixed together by screws 2329, with two resilient pieces 2323 and rollers 2324 disposed in the recesses 2325 of the body 2321, wherein the screws 2329 are twisted through the holes 2329' of the cover 2322 into the holes 2329" of the body 2321 to fix the body 2321 and the cover 2322 together. Furthermore, two slits 2327, 2327' are provided on the body 2321 to communicate with the recess 2325. A grooved hole 2326 is provided in the recess 2325 on the body 2321, while a slot 2328 is provided on the cover 2322 corresponding to the grooved hole 2326 of the body 2321. In assembly, the ends of the resilient piece 2323 are fitted into the slits 2327, 2327' so that the resilient piece 2323 is fixed. The shaft of the roller 2324 is disposed in the grooved hole 2326 at one end and disposed in the slot 2328 at the other end, with the resilient piece 2323 pushing against the roller 2324 (a pre-load).

Figure 4:
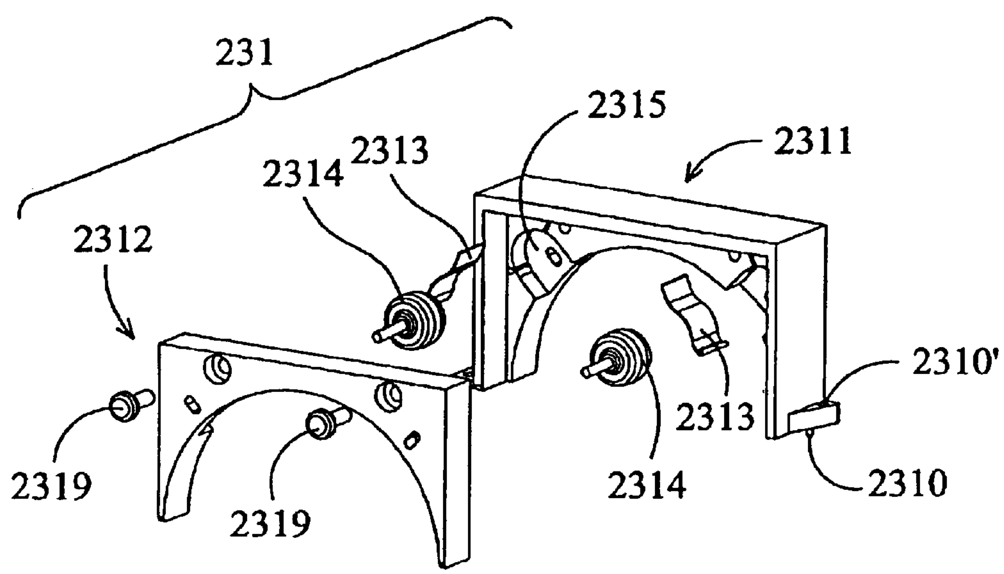
FIG. 4 is an exploded diagram of an upper support frame of the support structure of FIG. 2.

Referring to FIG. 4, the upper lens support frame 231 has a structure similar to the lower lens support frame 232. The upper lens support frame 231 has a body 2311 and a cover 2312 fixed together via screws 2319. The resilient pieces 2313 and the rollers 2314 are housed in the recesses 2315, while the resilient pieces 2313 apply a pre-load on the rollers 2314. The resilient pieces 2313 are made of, for example, metal. The upper lens support frame 231 is aligned with the lower lens support frame 232 by pins 2310 of the upper lens support frame 231 fitting into holes 2320 of the lower lens support frame 232. Then, screws (not shown) are twisted through holes 2310', 2320' to fix the upper and lower lens support frames 231, 232 together.

Figure 5:
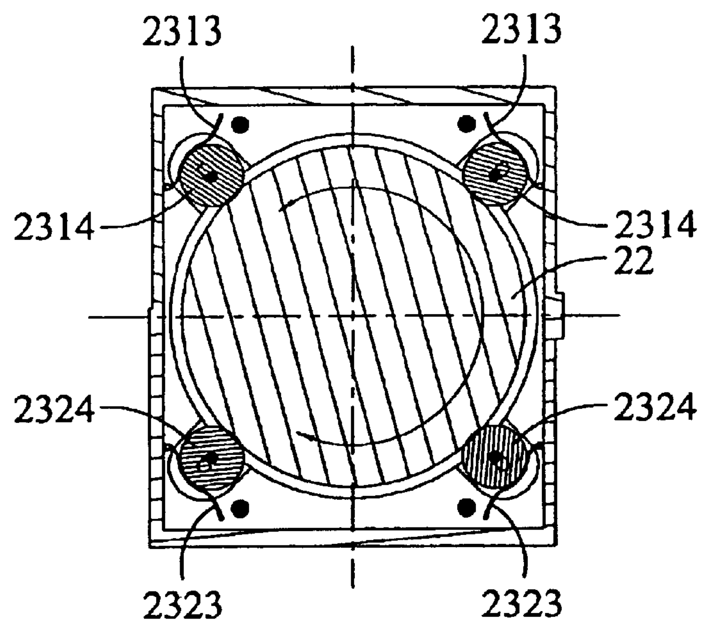
FIG. 5 is a sectional view of FIG. 2, along line V—V.

Referring to FIG. 5, the upper and lower rollers 2314, 2324 are pushed by the resilient pieces 2313, 2323 to support the lens sleeve 22. In operation, the upper and lower rollers 2314, 2324 rotated according to the rotation of the lens sleeve 22.

Figure 6:
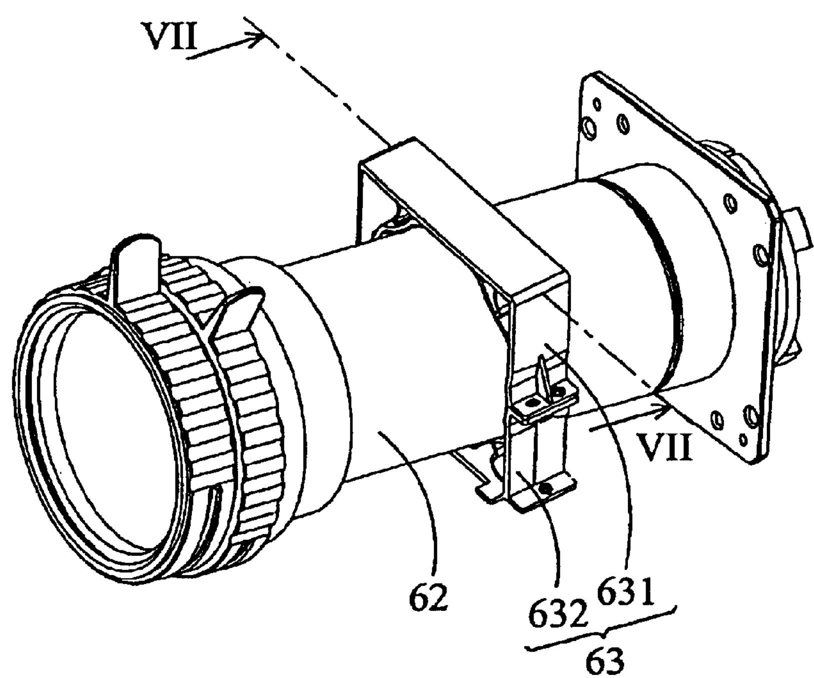
FIG. 6 depicts a support structure of a projector in accordance with a second embodiment of the present invention.

FIG. 6 depicts a support structure of a projector in accordance with a second embodiment of the present invention, wherein a support structure 63 includes an upper lens support frame 631 and a lower lens support frame 632, both of which have concave configuration so that a lens sleeve 62 can be held by the upper lens support frame 631 and the lower lens support frame 632.

Figure 7:
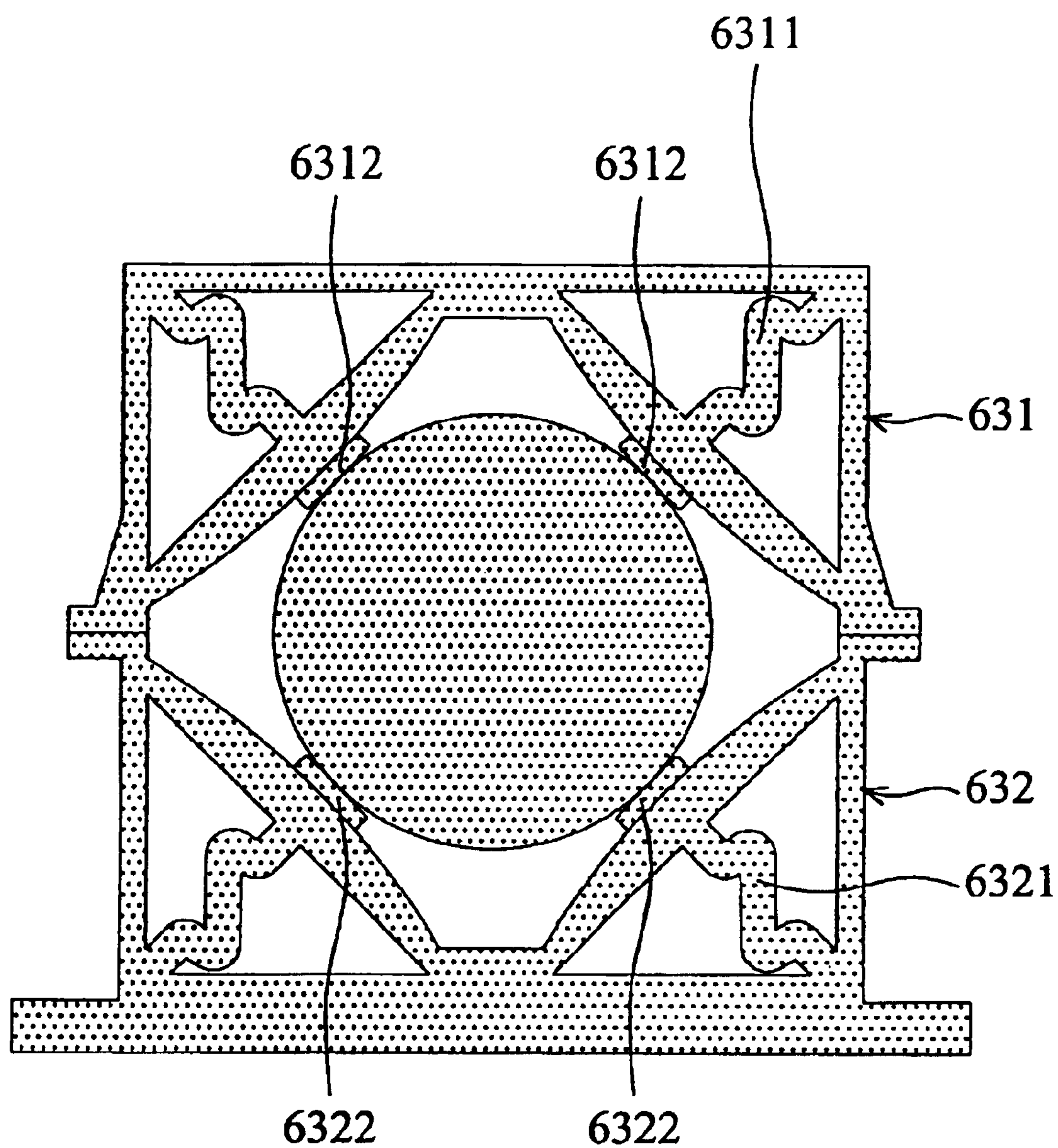
FIG. 7 is a sectional view of FIG. 6, along line VII—VII.

Referring to FIG. 7, the upper lens support frame 631 and the lower lens support frame 632 are integrally formed parts, with through holes therein to form a plurality of curved ribs 6311, 6321 to improve the elasticity thereof. Pads 6312, 6322 are respectively glued to the upper lens support frame 631 and the lower lens support frame 632 to contact the lens sleeve 62. The pads 6312, 6322 are made of material with low friction coefficient. In operation, the rotating lens sleeve 62 directly rubs the pads 6312, 6322 without impediment.

In conclusion, the present invention provides an improved support structure to prevent the lens sleeve from bending, without locking the rotation of the lens sleeve. The conventional problem is effectively solved.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector comprising:

an optical engine;

a lens sleeve having an end connected to the optical engine; and a support structure supporting the lens sleeve in a manner such that the lens sleeve can be rotated, wherein the support structure comprises at least one support frame having a concave configuration to support the lens sleeve, and wherein the support frame has a plurality of curved ribs to promote elasticity thereof.

2. A projector as claimed in claim 1, wherein the support structure comprises a first support frame and a second support frame, both of which have concave configurations to hold the lens sleeve therebetween.

3. A projector as claimed in claim 1, wherein the support structure further comprises a plurality of rollers mounted on the support frame to contact and support the lens sleeve so that the lens sleeve can be rotated with respect to the support frame via the plurality of rollers.

4. A projector as claimed in claim 3, wherein the support structure further comprises a plurality of resilient pieces mounted on the support frame to push the plurality of rollers toward the lens sleeve.

5. A projector as claimed in claim 1, wherein the support structure further comprises at least one pad fixed to the support frame, and the pad contacts the lens sleeve, so that the lens sleeve rubs the pad when rotated.

6. A support structure for a projector, the projector having an optical engine and a lens sleeve with one end connected to the optical engine, the lens sleeve having a side wall and a longitudinal axis, the support structure comprising:

a support frame defining a space to contain the lens sleeve; and a contact mechanism mounted on the support frame to support the side wall of the lens sleeve in a manner such that the lens sleeve can be rotated about the longitudinal axis; and a resilient member disposed between the support frame and the contact mechanism.

7. A support structure as claimed in claim 6, wherein the support frame comprises a first fixed frame and a second fixed frame, both of which have concave configurations to define the space when assembled.

8. A support structure as claimed in claim 6, wherein the contact mechanism is a roller mounted on the support frame to contact and support the side wall of the lens sleeve.

9. A support structure as claimed in claim 6, wherein the contact mechanism is a pad mounted on the support frame to contact and support the side wall of the lens sleeve.

10. A support structure as claimed in claim 6, wherein the resilient member is a metallic resilient piece.

11. A support structure as claimed in claim 6, wherein the resilient member is a curved rib integrally formed with the support frame.

12. A projector comprising:

an optical engine;

a lens sleeve having an end connected to the optical engine; and a support structure supporting the tens sleeve in a manner such that the lens sleeve can be rotated, which comprises:

a plurality of rollers mounted on a support frame to contact and support the lens sleeve so that the lens sleeve can be rotated with respect to the support frame via the plurality of rollers; and a plurality of resilient pieces mounted on the support frame to push the plurality of rollers toward the lens sleeve.

13. A projector as claimed in claim 12, wherein the support structure comprises at least one support frame having a concave configuration to support the lens sleeve.

* * * * *